Sept. 2, 1947.  L. H. VAN BILLIARD  2,426,905
VARIABLE CAPACITOR
Filed Feb. 4, 1944
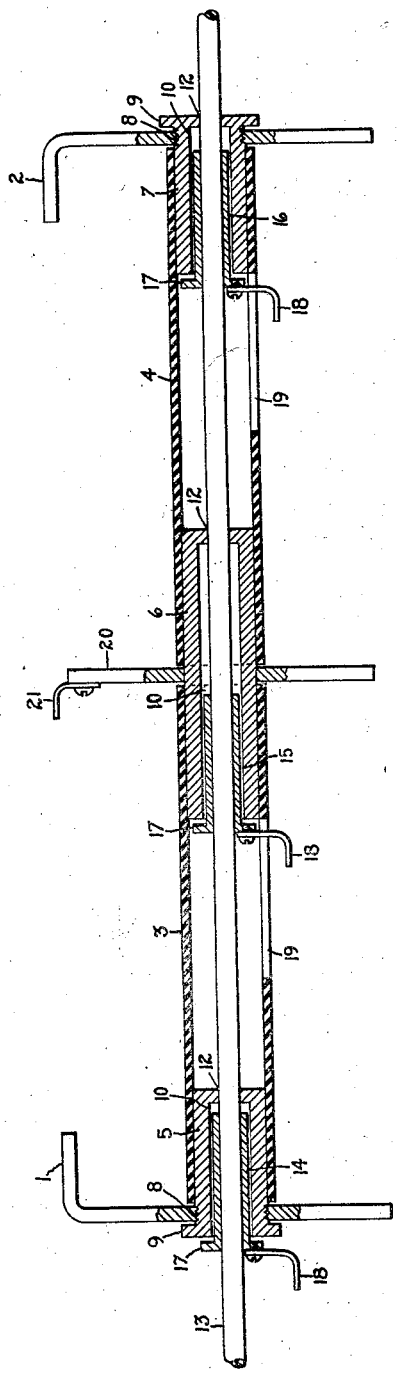
Inventor:
Lewis H. Van Billiard,
by Harry E. Dunham
His Attorney.

Patented Sept. 2, 1947

2,426,905

UNITED STATES PATENT OFFICE 2,426,905

VARIABLE CAPACITOR

Lewis H. Van Billiard, Newtown, Conn., assignor to General Electric Company, a corporation of New York Application February 4, 1944, Serial No. 521,039

6 Claims. (Cl. 175—41.5)

My invention relates to electric capacitors of the variable capacitance type and an object of my invention is the provision of an improved capacitor which has an air dielectric and which is simple in construction, reliable in operation and is inexpensive to manufacture.

My invention will be better understood from the following description taken in connection with the accompanying drawing and its scope will be pointed out in the appended claims.

In the drawing, the single figure of which is a longitudinal cross sectional view of one embodiment, I have chosen to illustrate my invention as comprising a multiple section capacitance tuner. As such it may be suspended from a chassis by the bracket 1, 2 which also functions as shields. The electrodes of the capacitor are enclosed in a protective casing comprising in the form illustrated two tubular sections 3 and 4 of insulating material. The fixed or outer electrodes are cylindrical in form and are represented at 5, 6 and 7, the same being held in spaced relation by the tubular sections. Of these electrodes the intermediate one, 6, is tightly fitted into adjacent ends of the tubular sections 3 and 4. The two other electrodes 5 and 7 fit snugly into the opposite ends of the tubular sections 3 and 4 but admit of adjustment in and out of those sections when rotated. For the purpose of such adjustment those electrodes have threaded engagement with the adjacent brackets 1 and 2 as shown at 8 and beyond the threaded part each of those electrodes has a collar 9 by which the electrode may be turned. Each electrode has a cylindrical bore represented at 10 and each at one end thereof has a concentric shaft bearing 12.

Journalled in the bearings 12 is the insulating shaft 13 and mounted on this shaft are the three concentric movable or inner cylindrical electrodes 14, 15 and 16 which are positioned on the shaft to engage respectively in the bores of the outer electrodes 5, 6 and 7. By this construction the tubular sections and the outer electrodes constitute an integral structure and the bores and bearings of the outer electrodes are maintained in exact alinement. Since the bearing part of each outer electrode is closely adjacent to the bore thereof an extremely small clearance may be provided between the inner and outer electrodes without danger of the resulting thin air dielectric being short circuited due to a bending of the parts.

Each inner electrode is shown having a flange 17 at one end thereof to which a flexible lead 18 is attached. The tubular sections 3 and 4 are provided with suitable slots 19 on their under sides through which pass the leads connected with the electrodes 15 and 16. The leads from the electrodes 14, 15 and 16 may for example connect respectively with an oscillator coil, an R. F. coil and an antenna coil of a tuner so that with proper prior adjustment of the electrodes 5 and 7 the desired variation in capacitance in circuit with each of said coils is effected simultaneously when the shaft is moved longitudinally. Secured to the intermediate outer electrode 6 is the shield 20 attached to which I have shown the grounding lead 21 inasmuch as this shield, unlike the brackets 1, 2, does not serve as a support.

What I claim as new and desire to secure by Letters Patent of the United States, is:

1. An adjustable capacitor comprising an insulating casing, a plurality of outer electrodes each having a bore and a shaft bearing, said electrodes being slidably engaged by said casing and supported thereby substantially throughout their lengths with their bores and bearings in alinement, an insulating shaft journalled for longitudinal movement in said bearings, a plurality of tubular electrodes mounted on said shaft and being spaced from each other to simultaneously enter at variable depths in the bores of said outer electrodes when said shaft is moved, said tubular electrodes being in close fitting engagement with said shaft throughout their respective lengths.

2. An adjustable capacitor comprising an insulating casing, a plurality of spaced outer electrodes each having a bore and each having a shaft bearing at one end thereof, said electrodes being slidably engaged by said casing and in contact therewith substantially throughout their respective lengths, supports for said electrodes, said supports and casing maintaining said bores and bearings in alinement, an insulating shaft journalled in said bearings, and a plurality of cylindrical electrodes in said outer electrodes mounted in spaced relation on said shaft in position to engage said bores at variable depths when said shaft is moved longitudinally in said outer electrodes, said cylindrical electrodes being in close fitting relation with said shaft throughout their respective lengths.

3. An adjustable capacitor comprising an insulating casing, a plurality of spaced outer electrodes each having a bore and each having a shaft bearing at one end thereof, said electrodes being mounted in said casing and supported thereby substantially throughout their respective lengths with their bores and bearings in alinement, means by which one of said electrodes may be adjusted longitudinally in said casing, an insulating shaft journalled in said bearings and a plurality of spaced cylindrical electrodes mounted on said shaft and in close fitting engagement therewith throughout their respective lengths, each engaging in one of said bores.

4. An adjustable capacitor comprising an insulating tubular casing, a plurality of outer cylindrical electrodes mounted in spaced relation in said casing, each of said electrodes having a bore and a shaft bearing, an insulating shaft journalled in said bearings, a plurality of spaced inner cylindrical electrodes each comprising a single metallic tube telescoped on said shaft and in close-fitting contact therewith throughout its length and each engaging in the bore of one of said outer electrodes, one of said inner electrodes having a terminal lead extending therefrom, said casing having an elongated opening therein through which said lead extends.

5. An adjustable capacitor comprising supporting brackets, a plurality of spaced cylindrical electrodes respectively supported by said brackets, at least one of said electrodes having a threaded engagement with the bracket whereby said electrode is supported, insulating tubular slotted casings each engaging at one end externally with a respective one of said electrodes and supporting said one electrode substantially throughout its length, an intermediate cylindrical electrode engaging internally with the opposite ends of said casings, each of said electrodes having a cylindrical bore and a bearing at one end thereof, an insulating shaft journalled in said bearings and arranged to slide longitudinally therein, and an inner cylindrical electrode in each of said bores comprising a single metallic tube mounted on said shaft and in close-fitting contact therewith throughout its entire length, and terminal leads extending from two of said electrodes through slots in said casings.

6. An adjustable capacitor comprising a tubular insulating casing, a first tubular electrode telescoped within said casing and in close-fitting contact therewith substantially throughout its length, said electrode having a bearing portion formed integrally therewith at one end thereof, an insulating shaft journalled in said bearing for movement axially of said electrode, and a second tubular electrode telescoped on said shaft and in close-fitting contact therewith throughout its length, said second electrode being in closely spaced relation with and movable within said first electrode by movement of said shaft axially of said bearing, and additional bearing means spaced from said bearing portion supporting said shaft axially of said casing, said additional bearing means including means for supporting said casing to maintain the radial spacing between said first and second electrodes substantially constant as said shaft is moved axially in said bearing portion and said bearing means.

LEWIS H. VAN BILLIARD.

REFERENCES CITED

The following references are of record in the file of this patent:

UNITED STATES PATENTS

| Number | Name | Date |
|---|---|---|
| 2,281,147 | Franklin | Apr. 28, 1942 |
| 2,315,330 | Horowitz | Mar. 30, 1943 |
| 1,567,067 | Lindberg | Dec. 29, 1925 |
| 1,709,601 | Benjamin | Apr. 16, 1929 |
| 1,836,583 | Elliott | Dec. 15, 1931 |
| 2,273,522 | Horowitz | Feb. 17, 1942 |